(12) United States Patent
Turányi et al.

(10) Patent No.: US 9,379,991 B2
(45) Date of Patent: Jun. 28, 2016

(54) COMMUNICATION NODE, A RECEIVING NODE AND METHODS THEREIN

(71) Applicant: Telefonaktiebolaget L M Ericsson (publ), Stockholm (SE)

(72) Inventors: Zoltán Richárd Turányi, Szentendre (HU); Szilveszter Nádas, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 105 days.

(21) Appl. No.: 14/505,691

(22) Filed: Oct. 3, 2014

(65) Prior Publication Data

US 2015/0117220 A1 Apr. 30, 2015

(30) Foreign Application Priority Data

Oct. 31, 2013 (EP) ..................................... 13191101

(51) Int. Cl.
| | |
|---|---|
| *H04L 12/833* | (2013.01) |
| *H04L 12/823* | (2013.01) |
| *H04L 12/803* | (2013.01) |
| *H04L 12/825* | (2013.01) |
| *H04L 12/721* | (2013.01) |
| *H04L 12/801* | (2013.01) |
| *H04L 12/851* | (2013.01) |

(52) U.S. Cl.
CPC .............. *H04L 47/32* (2013.01); *H04L 45/127* (2013.01); *H04L 47/12* (2013.01); *H04L 47/125* (2013.01); *H04L 47/17* (2013.01); *H04L 47/24* (2013.01); *H04L 47/2458* (2013.01); *H04L 47/26* (2013.01); *H04L 47/35* (2013.01); *H04L 47/29* (2013.01)

(58) Field of Classification Search
None
See application file for complete search history.

(56) References Cited

U.S. PATENT DOCUMENTS

| 6,028,857 | A | 2/2000 | Poor | |
|---|---|---|---|---|
| 7,957,292 | B2 * | 6/2011 | Shi | H04L 47/10 370/235.1 |
| 2003/0214921 | A1 | 11/2003 | Alapuranen et al. | |
| 2006/0104298 | A1 | 5/2006 | McAlpine et al. | |

OTHER PUBLICATIONS

Zhou, L., et al., "System Scheduling for Multi-Description Video Streaming Over Wireless Multi-Hop Networks", IEEE Transactions on Broadcasting, Dec. 1, 2009, pp. 731-741, vol. 55, No. 4, IEEE.
Shi, Z., "Congestion Control with the Fixed Cost at the Domain Border", 2nd International Conference on Future Computer and Communication (ICFCC), May 21, 2010, pp. V3-817-V3-821, vol. 3, IEEE.

* cited by examiner

*Primary Examiner* — Timothy J Weidner
(74) *Attorney, Agent, or Firm* — Coats & Bennett, PLLC

(57) ABSTRACT

A method in a communication node for handling a packet to a destination node in a communications network, and associated nodes. The communication node associates the packet with a remaining value, with the remaining value being a packet value reduced by a threshold value of an outgoing link from the communication node towards the destination node. The threshold value corresponds to a congestion level of the outgoing link. The communication node further handles the packet based on the remaining value, the handling including determining whether to drop or to transmit the packet along the outgoing link based on the remaining value.

22 Claims, 13 Drawing Sheets

COMMUNICATION NODE, A RECEIVING NODE AND METHODS THEREIN

RELATED APPLICATION

This application claims benefit of European patent application no. EP13191101.8, filed 31 Oct. 2013, the disclosure of which is incorporated herein by reference in its entirety.

TECHNICAL FIELD

Embodiments herein relate to a communication node, a receiving node and methods therein in a communications network. In particular, embodiments herein relate to handle packets in the communications network

BACKGROUND

In a typical radio communications network, wireless terminals, also known as mobile stations and/or user equipments (UEs), communicate via a Radio Access Network (RAN) to one or more core networks. The RAN covers a geographical area which is divided into cell areas, with each cell area being served by a base station, e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipments within range of the base stations.

In some versions of the RAN, several base stations are typically connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

A Universal Mobile Telecommunications System (UMTS) is a third generation mobile communication system, which evolved from the second generation (2G) Global System for Mobile Communications (GSM). The UMTS Terrestrial Radio Access Network (UTRAN) is essentially a RAN using Wideband Code Division Multiple Access (WCDMA) and/or High Speed Packet Access (HSPA) for user equipments. In a forum known as the Third Generation Partnership Project (3GPP), telecommunications suppliers propose and agree upon standards for e.g. third generation networks and further generations, and investigate enhanced data rate and radio capacity.

Specifications for the Evolved Packet System (EPS) have been completed within the 3GPP and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base stations are directly connected to the EPC core network rather than to RNCs. In general, in E-UTRAN/LTE the functions of a RNC are distributed between the radio base stations, e.g., eNodeBs in LTE, and the core network. As such, the RAN of an EPS has an essentially "flat" architecture comprising radio base stations without reporting to RNCs.

Packets are transported in a Core Network along paths in a transport network also referred to as a communications network herein. Today two broad category of transport networking is available. In one, called automatic, path selection is automatic, usually distributed, and, usually, follows the shortest path paradigm. Internet Protocol (IP) routing, IP/Multiprotocol label switching (MPLS), and Ethernet Shortest Path Bridging (SPB) clearly fall into this category. The other approach, called traffic engineering, is more circuit aware and relies on setting up explicit paths across the network with usually resource reservation included. Generalized MPLS (GMPLS), MPLS-Transport Profile (TP), Provider Backbone Bridges Transport Profile (PBB-TP) and Resource Reservation Protocol (RSVP) all fall into this category.

Automatic solutions are great and have low management burden. By most of the time relying on shortest paths they also achieve some form of low delay efficiency. They can be expanded with automatic fast reroute and Equal-Cost Multipath (ECMP) to increase reliability and network utilization. The automatic solutions, however, fail to offer Quality of Service (QoS) measures. Usually simple packet priorities or DiffServ handling accompanies them with no effort to guarantee any sort of bandwidth even in a soft way.

Traffic engineering solutions are focusing on reserving capacity to flows and are more suited to provide bandwidth guarantees, but path computation may be potentially very complicated if alternative paths want to be used for higher utilization. Also, robustness is usually achieved by reserving an alternative path, which is a waste of resources. Transport equipment, such as communication nodes, usually has very limited packet processing capabilities. A few priority or weighted fair queues, a few levels of drop precedence is what are usually available, since emphasis is on high throughput and low price per bit.

SUMMARY

An objective of embodiments herein is to provide a mechanism that enables packet handling in an efficient manner in a communications network.

According to a first aspect the objective is achieved by providing a method in a communication node for handling a packet to a destination node in a communications network. The communication node associates the packet with a remaining value, which remaining value is a packet value reduced by a threshold value of an outgoing link from the communication node towards the destination node. The threshold value corresponds to a congestion level of the outgoing link. The communication node handles the packet based on the remaining value, which handling comprises determining whether to drop or to transmit the packet along the outgoing link based on the remaining value.

According to another aspect the objective is achieved by providing a method in a receiving node for receiving a packet from a communication node in a communications network. The receiving node receives a packet over an incoming link from a communication node, which packet comprises a remaining value. The remaining value is a packet value reduced by a threshold value of an outgoing link from the communication node towards the receiving node, which threshold value corresponds to a congestion level of the outgoing link. The receiving node generates, in response to receiving the packet, a packet of feedback, which packet comprises a value that corresponds to a congestion level at an outgoing link of the receiving node.

According to yet another aspect the objective is achieved by providing a communication node for handling a packet to a destination node in a communications network. The communication node is configured to associate the packet with a remaining value, which remaining value is a packet value reduced by a threshold value of an outgoing link from the communication node towards the destination node. The threshold value corresponds to a congestion level of the outgoing link. The communication node is further configured to handle the packet based on the remaining value by determining whether to drop or to transmit the packet along the outgoing link based on the remaining value.

According to still another aspect the objective is achieved by providing a receiving node for receiving a packet from a communication node in a communications network. The receiving node is configured to receive a packet over an incoming link from a communication node. The packet comprises a remaining value, which remaining value is a packet value reduced by a threshold value of an outgoing link from the communication node towards the receiving node. The threshold value corresponds to a congestion level of the outgoing link. The receiving node is also configured to generate, in response to receiving the packet, a packet of feedback. The packet of feedback comprises a value that corresponds to a congestion level at an outgoing link of the receiving node.

Embodiments herein provide an advantage that is to permit a fully automatic communications network that takes QoS into account and aims to use all available links to carry traffic. That is, due to using the remaining value, more valuable traffic enjoys a preference over less valuable traffic, and packet handling is performed more efficiently.

BRIEF DESCRIPTION OF THE DRAWINGS

Embodiments will now be described in more detail in relation to the enclosed drawings, in which.

DETAILED DESCRIPTION

Communications networks such as transport networks face many challenges. On one hand the communications networks should be easy to operate, plug and play and be as automatic as much as possible. Adding or removing communication nodes and links should require no significant reconfiguration. Handling failures and restoration should be quick and automatic, with graceful degradation whenever possible. Finally, it is good if the communications networks require little configuration and tuning, in general. On the other hand the communications networks should provide the best possible performance. The communications networks should utilize links efficiently, and should carry as much traffic as possible. And finally, the communications networks should provide some form of QoS support, so when the offered load is higher than what is possible to carry, operator policy may define, who gets what priority or what part of the resources. Finally, the complexity of the communications network should be low, hardware should be cheap, state should be minimal, and/or signaling should be low.

In embodiments herein a communications network is provided that has a minimal set of tuning parameters, is fully automatic and may be implemented in hardware with reasonable control and signaling complexity. At the same time, embodiments herein strive to utilize all resources in the communications network in the most efficient way and honors QoS in a way that enables a very rich set of operator policies ranging from simple priority through proportional resource sharing to full QoE support.

The methods herein may be implemented in any protocol layer, such as Internet Protocol (IP), Multiprotocol label switching (MPLS) or Ethernet. Packets may carry 8-16 bits of packet value and some ways to identify flows that are not splittable, e.g. access to IP 5 tuples or an entropy label. 5-tuple data and using entropy labels are two ways of identifying microflows.

Figure 1:
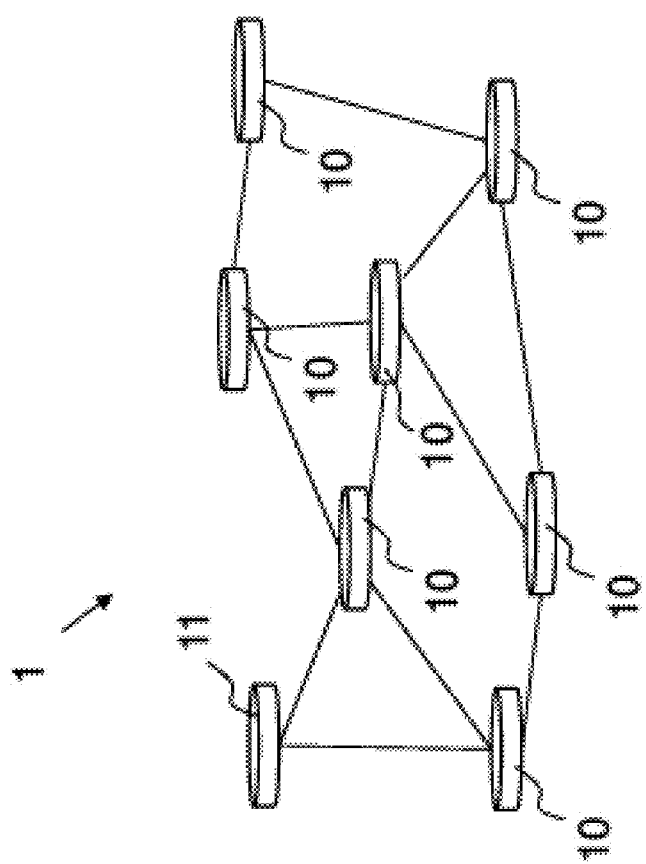
FIG. 1 shows a schematic overview depicting a communications network according to embodiments herein.

FIG. 1 is a schematic overview depicting a communications network 1 according to embodiments herein. The communications network 1 comprises a plurality of communication nodes 10. Packets are transported over the communications network 1 to a receiving node or a destination node 11. The communication node 10 may be a router, a switch, or any node with a scheduler or a packet handler transporting one or more packets within the communications network 1. The communication node 10 associates the packet with a remaining value. The remaining value is a packet value reduced by a threshold value of an outgoing link from the communication node 10 towards the destination node 10. The threshold value corresponds to a congestion level of the outgoing link and the packet value corresponds to a level of importance. The communication node 10 handles the packet based on the remaining value, which handling comprises determining whether to drop or to transmit the packet along the outgoing link based on the remaining value.

Figure 2:
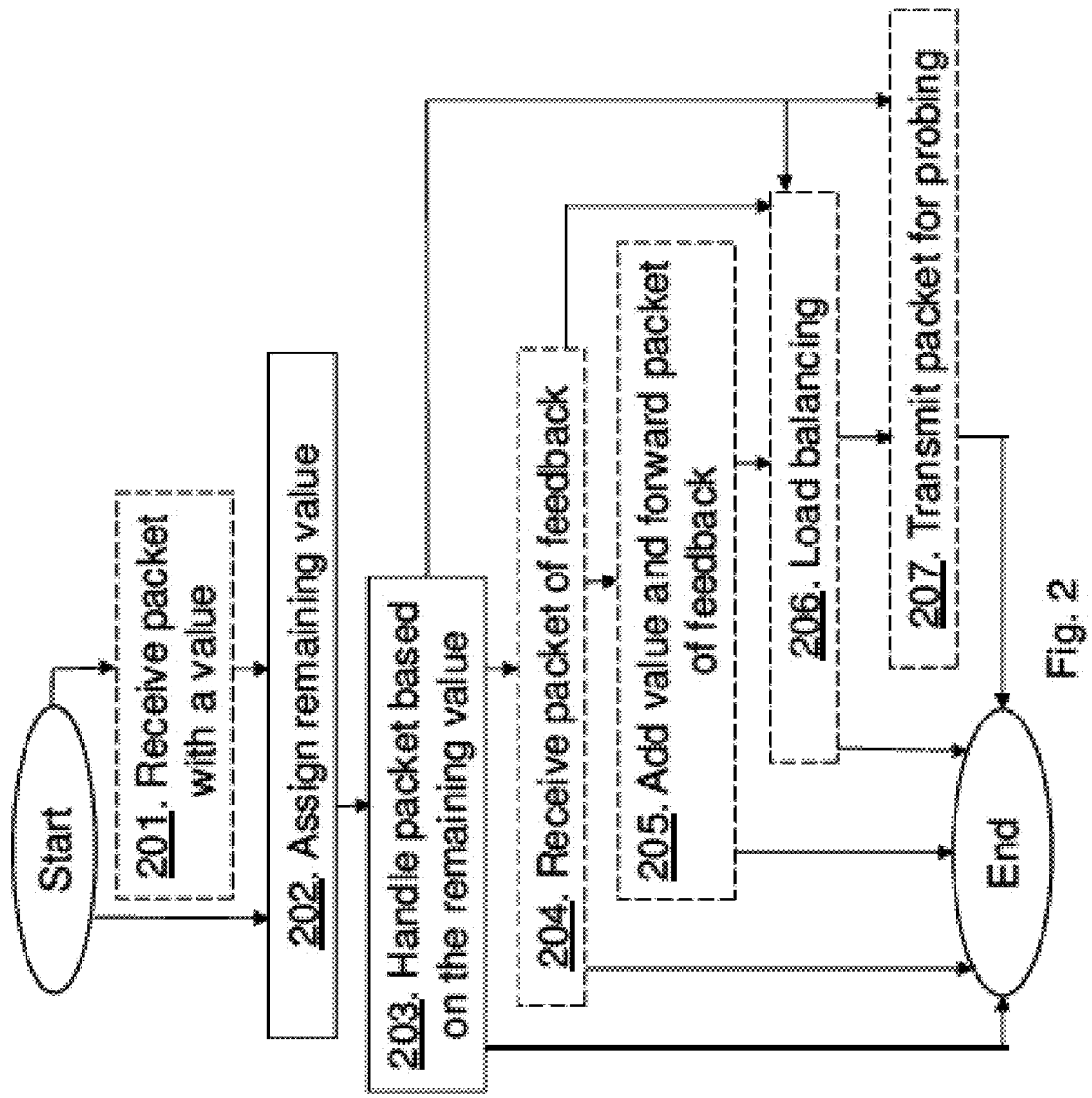
FIG. 2 shows a schematic flowchart according to embodiments herein.

The method actions in the communication node 10 for handling a packet to the destination node 11 in the communications network 1 according to some embodiments will now be described with reference to a flowchart depicted in FIG. 2. The actions do not have to be taken in the order stated below, but may be taken in any suitable order. Actions performed in some embodiments are marked with dashed boxes.

Action 201.

The communication node 10 may receive the packet with a packet value over an incoming link to the communication node.

Action 202.

The communication node 10 associates the packet with a remaining value, which remaining value is the packet value reduced by a threshold value of an outgoing link from the communication node 10 towards the destination node 11. The threshold value corresponds to the congestion level of the outgoing link. For example, the communication node 10 may replace the packet value with the remaining value thereby associating the packet with the remaining value.

Action 203.

The communication node 10 handles the packet based on the remaining value, which handling comprises determining whether to drop or to transmit the packet along the outgoing link based on the remaining value. For example, the communication node 10 transmits the packet with the remaining value under certain conditions. In some embodiments the communication node 10 handles the packets by dropping the packet when the remaining value is zero or below. The communication node 10 may handle the packet by marking the packet with the remaining value and transmitting the packet along the outgoing link when the remaining value is above zero. In some embodiments packets with remaining values of below zero are dropped and with values of zero and above are transmitted. In some embodiments, the communication node 10 may further prioritize packets based on level of remaining values to maximise performance.

Action 204.

The communication node 10 may further receive a packet of feedback over the outgoing link indicating a second threshold value from another communication node, e.g. the receiving node. In some embodiments the communication node 10 receives a respective packet of feedback over the outgoing link and at least one other outgoing link. The respective packet of feedback comprises a value which corresponds to a congestion level towards the destination node 11. The one or more values of the packet of feedback may be stored at the communication node 10 to be used in packets of feedback, relating to the destination node 11, transmitted later and/or periodically.

Action 205.

The communication node 10 may then add the threshold value to the packet of feedback and forward the feedback over an incoming link. For example, the communication node 10 may in action 204 receive a packet of feedback over an outgoing link, which packet of feedback comprises a value which corresponds to a congestion level at another communication node connected via the outgoing link to the communication node 10. The communication node 10 then copies the value from the received packet of feedback to one or more packets of feedback, and adds the threshold value to the one or more packets of feedback. In addition, the communication node 10 transmits the packet of feedback over a respective incoming link towards a respective communication node. This may be the case when the communication node is a merging node, i.e. more incoming links than outgoing links. In the event the communication node 10 is a splitting node, i.e. a communications node with more outgoing links than incoming links the communication node 10 may behave like the following. The communication node 10 receives, in action 204, a respective packet of feedback over at least two outgoing links. The respective packet of feedback comprises a value, wherein each respective value corresponds to a congestion level at a respective communication node connected, via respective outgoing link, to the communication node 10. The communication node 10 combines the respective values into one value; and attaches the combined value with the threshold value to a packet of feedback. The packet of feedback is then transmitted over an incoming link towards another communication node. The combining may comprise averaging the respective values, and/or taking a split ratio for load balancing into account. In some embodiments the communication node 10 receives a packet of feedback over an outgoing link. The packet carries one value per destination node being multiplexed into the packet, e.g. the packet may comprise a number of values each related to a respective destination node. The communication node then de-aggregates the value per destination node and updates the value for each destination node by adding the threshold value to the value per destination node. Furthermore, the communication node 10 re-aggregates the updated values into a packet of feedback, and transmits the packet of feedback over an incoming link towards another communication node. It should be noted that any outgoing link in the application may very well be an incoming link for a different piece of traffic. Also, the packet of feedback packet is specific to a certain path/destination/piece of traffic, whereas the local congestion threshold is not, it covers all traffic leaving on that port/link. Outgoing means from the node towards the destination, and incoming means from another node towards the destination.

Action 206.

In some embodiments the communication node 10 performs load balancing over the outgoing link and the at least one other outgoing link taking the values of the respective packet into account.

Action 207.

The communication node 10 may transmit some, one or more, packets with a remaining value of zero or below for probing the outgoing link. That is, to see if the packet goes through.

According to embodiments herein the packet value corresponds to a level of importance along a linear scale, and the threshold value corresponds to a congestion level along a linear scale.

Figure 3:
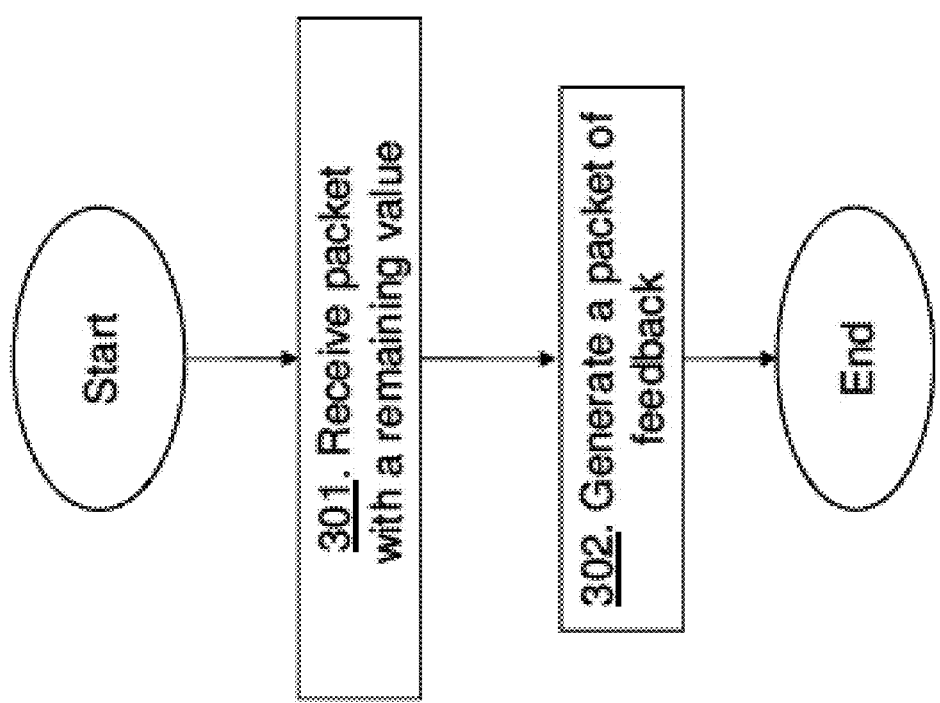
FIG. 3 shows a schematic flowchart according to embodiments herein.

The method actions in the receiving node, which may be one of the communication node 10 or the destination node 11, for receiving packets from the communication node 10 in the communications network 1 according to some embodiments will now be described with reference to a flowchart depicted in FIG. 3.

Action 301.

The receiving node receives a packet over an incoming link from the communication node 10. The packet comprises a remaining value, which remaining value is a packet value reduced by a threshold value of an outgoing link from the communication node 10 towards the receiving node. The threshold value corresponds to a congestion level of the outgoing link.

Action 302.

The receiving node then generates, in response to receiving the packet, a packet of feedback, which packet comprises a value that corresponds to a congestion level at an outgoing link of the receiving node.

In some embodiments wherein the receiving node is the destination node 11 then the value is set as an initial value of zero as no outgoing traffic occurs from the destination node 11.

Figure 4:
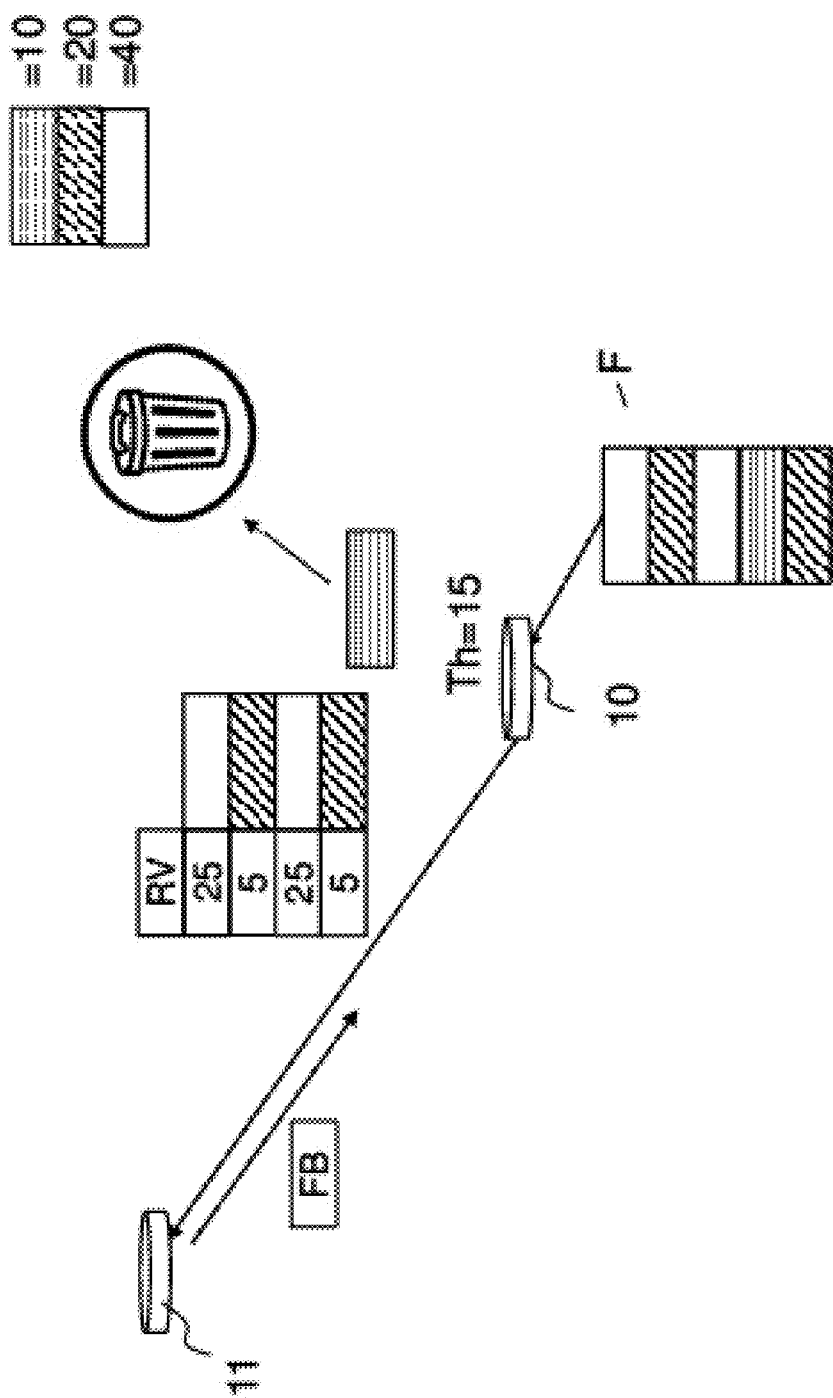
FIG. 4 shows a schematic overview depicting embodiments herein.

FIG. 4 discloses a block diagram depicting the communication node 10 transmitting packets to the destination node 11. The communication node 10 receives a flow, F, of packets of different values relating to the service of the different packets, e.g. values '10', '20', '40'. The communication node 10 assigns the remaining value, RV, to the packets. The threshold value, Th, which is a locally generated value indicating congestion of the outgoing link towards the destination node 11, is reduced from the value of the packet, e.g. Th=15. Packets with a remaining value of zero or below, in this case packets of value 10, is dropped, or in some embodiment only below zero. The destination node 11 may in response to the reception of packets from the communication node 10 generate and transmit a packet of feedback, FB, to the communication node 10, in this case with a value of zero as there is no outgoing links from the destination node. The communication node 10 then receives the packet of feedback, adds the threshold value '15' to the packet of feedback and transmits the packet of feedback to another, one or more, communication nodes.

Embodiments herein use a concept of packet values (PPOV). The packet value is corresponding to a level of importance of the packet along a linear scale. The value indicates a level of importance of the packet relative importance of another packet. For example, the packet value '100' indicates that the packet is 10 times as important as a packet with the value '10' and 100 times as important as a packet with value '1'. The importance may be determined based on the actual contents of the packet payload, e.g. important video frame, or based on the specific packet flow, e.g. premium traffic of gold subscriber, or based on throughput commitments, e.g. whether or not this packet is needed to reach a certain level of throughput, or a combination of these, or any other, criteria. Packet values are carried in each packet and represent the utility the operator gets from delivering one byte of this packet. Thus even if the name implies the value of the total packet, the value is multiplied by the length of the packet to get the value of the total packet. The name is still packet value to denote the entire concept and differentiate it from flow values. The communications network strives to maximize the total value of packets transmitted, see below.

Packets are marked at an ingress edge node, which is a first node that receives packets in the communications network 1, with their value based on the service the operator wants to provide. A few examples of marking strategies are given below.

In case the incoming services has Service Level Agreements (SLA), of say a Committed Information Rate (CIR) and an Excess Information Rate (EIR), the ingress edge node may mark CIR amount of traffic as high value and EIR amount of traffic as low value and throw away the rest, or assign it a value of zero. The operator may distinguish between less and more important customers or services by using different values for CIR traffic of them, e.g. a more important customer or service may get a higher value for its CIR traffic than a less important customer or service. Services may be classified and values assigned to them based on policy. Deep Packet Inspection (DPI) may also be used to classify traffic. Note that one does not have to assign the same value to all packets of a flow or services. E.g., a high value may be used up to a certain number of packets, to make sure that the number of packets goes through most of the time, and then increasingly lower values to additional pieces of traffic or packets, which will go through only at lower and lower congestion levels. E.g., the base layer of a video flow may be differentiated from enhancement layers by assigning higher value to the packets of the base layer compared to packets of the enhancement layers.

Proportional resource sharing among flows with the right marking may as well be achieved.

For the simplicity of description, the value '100' is the highest value used in the examples and value '0' is the lowest value, but the system works with any sufficiently granular value range. Individual nodes should strive to maximize the total packet values transmitted. This may easily be achieved by transmitting packets with higher value instead of packets with a lower value. One simple algorithm, which also preserves packet ordering is as follows. Packets arrive to the back of a single First In First Out (FIFO) queue and get served from the front of it. If, however, the queue is full, the value of the incoming packet is compared with the value of the lowest value packet in the queue. If the arriving packet is more valuable than the lowest value packet in the queue, the latter is dropped and the former is queued to the back of the queue. If there are multiple packets in the queue with the same low value, the one closest to the front of the queue is dropped.

One way to increase network utilization is by Load Balancing (LB). With LB, multiple alternative transmission paths are set up, and the traffic is divided among them. This spreads load and helps easing hot-spots of traffic. Note that typically packets travelling on different alternative paths experience different delay and may get merged in the wrong order. Typically congestion control in end systems get confused and reduce transmission rate if packets of the same L4 connection, e.g., Transport Control Protocol, TCP, experience consistent re-ordering. There are other disadvantages of reordering. Therefore all load balancing solutions aim to keep packets of the same end to end (e2e) flow on the same path. This is usually achieved by calculating a hash of the ultimate source and destination address, sometimes port numbers, too, and using the hash to select the transmission path. Since LB is used in some embodiments herein, some different examples are described herein.

In the simplest form load balancing is static. A fraction of traffic, usually equal share, is sent on each alternative path.

A more complicated way is dynamic load balancing, where the split ratio is set dynamically in response to some feedback about the congestion/utilization level of each alternative path with the aim to balance load/congestion on them. Many such schemes exist in e.g. Asynchronous Transfer Mode (ATM) networks.

A simple scenario to load balance based on the congestion situation using packet values is described herein. In previous load balancing, it is described a load balancing aiming to achieve the same level of congestion on alternative links, as defined above. This solution was limited to a simple topology of a load balancer and outgoing links of one hop. As discussed above, no communication network approach provides automatic operation, with manageable path computation complexity, and bandwidth guarantees at the same time. QoS support in communications networks is also limited. Communication networks most often offer a few classes of service only. This makes network virtualization, the ability to slice a physical or logical network, especially difficult, as there is no fine grained control over how transport resources are shared among flows, tenants or packets.

Automatic load balancing schemes exist, e.g. like ATM, however, they rely on either binary congestion feedback or a feedback of link utilization along the various paths. These, however, do not work well, if all links are congested. They also fail to take QoS into account.

Some embodiments herein have the following components.
  1. Relying on a value of each packet, also called per-packet value (PPOV) or original value, and load balancing may be based on the value, and the remaining value is also herein defined. The remaining value is essentially the original value of the packet minus a current congestion threshold of the links it has already traversed. It is easy to calculate and update in a packet header at every hop for every packet.
  2. A feedback scheme in the form of Operation Administration Maintenance (OAM) packets, i.e. packets of feedback, that travel backwards along packet paths and collect the threshold levels (per egress node). Specifically embodiments herein describe how such levels are to be merged among multiple paths.

3. Load balancers at branching nodes in the communications network 1 that distribute the packets among outgoing alternative links such that the threshold levels received through the feedback become equal on each alternative path. That is, if two alternative paths exist with different threshold levels, some of the traffic may be shifted from the path with the higher threshold, higher congestion, to the path with the lower threshold. This is done slowly enough to avoid oscillations.

Embodiments herein enables e.g. a path computation mechanism in the communications network 1 that computes a Directed Acyclic Graph (DAG) along the path which the packets travel. Load balancers may then be placed at the branching points of this DAG.

4. An optional policer at entry and branching points, which policer drop low-value packets that are unlikely to get through to allow transmission of other equally low value packets that are more likely to get delivered and realize value.

Remaining Value

Embodiments described herein assume a transport network, the communication network 1, which carries traffic between its edge nodes. Thus a destination node will always be one of the edge nodes. First it is shown how packet value marking may be updated at every hop in the communication network 1. Then it is explained how path computation is done. After that it is shown how packet value based congestion level is collected along paths, and finally the operation of the whole system is described.

According to embodiments herein packets that are scheduled, and actually transmitted will have their value reduced by the current congestion level of the link. The congestion level shows the threshold value under which packets are dropped at this link. Thus the difference between the value of a transmitted packet and the congestion level shows the value gain of transmitting the packet. That is because, if the packet would be dropped, then another packet with value equal to the congestion threshold could have been transmitted instead. Thus, the congestion level at a link is a certain cost for the packets that are transmitted (in the form of a missed gain) over the link.

For example, at a link with current congestion level of '30', packets below value of '30' are dropped, and the more valuable ones are transmitted. If a packet with incoming value of '70' is transmitted, we are better off by 40 as compared to the case of not transmitting it, since in that case we would have transmitted one of the packets of value '30', or below, but it is assumed a sufficiently large number of packets from each value. Thus the transmitting of the packet of '70', costs 30.

In short, the value field of packets is interpreted as "remaining value", that is, the original value of the packet, which we get by delivering it, minus the cost (the missed gain) it has taken so far along its path.

Note that this "remaining value" may not go below zero, because a packet is dropped, in some embodiments, if its remaining value is lower than the congestion threshold at a link.

The intuition behind the concept of "remaining value" is to cater for varying path length. Transmitting a packet of value '70' over a ten hop path consumes resources at each of the links, potentially preventing less important packets to get delivered at those links. Assume that at each of the ten links there is local one-hop traffic. Even if the local traffic is less important, delivering 10 local packets (one at each link) of value '8' will result in the delivered value of 80, which is higher than the value from delivering the packet of value '70' along the long path. Thus comparing original packet values at scheduling will not yield to highest total gain—one has to balance a packets original value against the total cost along the path. The practical tool for that is the remaining value.

Determining Threshold Value or Congestion Level

The lowest of the value of packets that can get served from a value maximizing queue is representative to the level of congestion. Under stationary conditions packets above this threshold value all get served, while packets below it will not. Of course, traffic is seldom stationary, thus the ideal threshold cannot be computed at any given moment. However, it can be estimated over some time scale. One way to estimate is to take some percentile of the value of packets transmitted over a time slot. Say, collect the values of all packets transmitted in a 'one second' slot and use their 5% percentile value.

The threshold value captures the relation of a) the capacity of the link; b) the volume of offered traffic and c) the QoS requirements of offered traffic. That is, the same threshold of 80 can result both from two different congestion situations. Situation "A" is having important offered traffic in the 75-100 range, which is just a bit more than the capacity of the link. Situation "B" is having five times more offered traffic than the link can carry evenly distributed in value between 0-100. (Note that load balancing between two such paths based on load, utilization, packet loss, queue size or, in fact, any feedback measure other than the QoS threshold would start shifting load from the path in situation "B" to the path in situation "A" thereby resulting in the loss of many important packets on the path with situation "A".) The congestion level of a not fully utilized link is by definition zero, as even packets of zero values can be delivered.

Path Calculation

Several suitable path calculation methods may be used and any path calculation method fulfilling the below requirements may be used. The algorithm may provide a DAG for each packet, where edge nodes point towards the destination node 11 and where a root node is at the destination node 11. This means that each node in the DAG must have outgoing links, except the destination node 11. If the destination node 11 is a destination of an 'anycast' packet, the traffic may be delivered to any one of a set of egress edge nodes, the DAG may have multiple roots. Depending on the forwarding mechanism in the communications network 1, the DAG may be provided in several ways.

If the communication nodes 10 use destination address lookup to forward packets, one DAG may be calculated for each destination node, and each communication node 10 where traffic may originate toward this destination node 11 may be a leaf node, i.e. entry point, in the DAG.

If the communication nodes 10 use both the source and destination addresses to determine the next hop, one DAG may be calculated for each source-destination pair.

In case of any other lookup key, one DAG may be calculated for each value of the lookup key. Note that label-based forwarding may emulate any of the two behaviors above. The DAG may be calculated in any suitable way, and it is just assumed that the DAG is calculated.

The simplest form of a DAG calculation algorithm is a shortest path algorithm with equal cost multipath. However, any other algorithm suffices. Actually, the more alternative paths that are added to the DAG, the better the system will be in spreading load, and achieving higher utilization and network goodput, which is the application level throughput.

Since the aim is to define an autonomous communications network, it is a bonus if the DAG calculation algorithm may be run in a distributed fashion. This is possible, since it does not need to consider resource utilization among the pieces of traffic, only the topology. But, if the DAGs are calculated centrally and are distributed to the communication nodes 10 directly, that also work fine.

Figure 5:
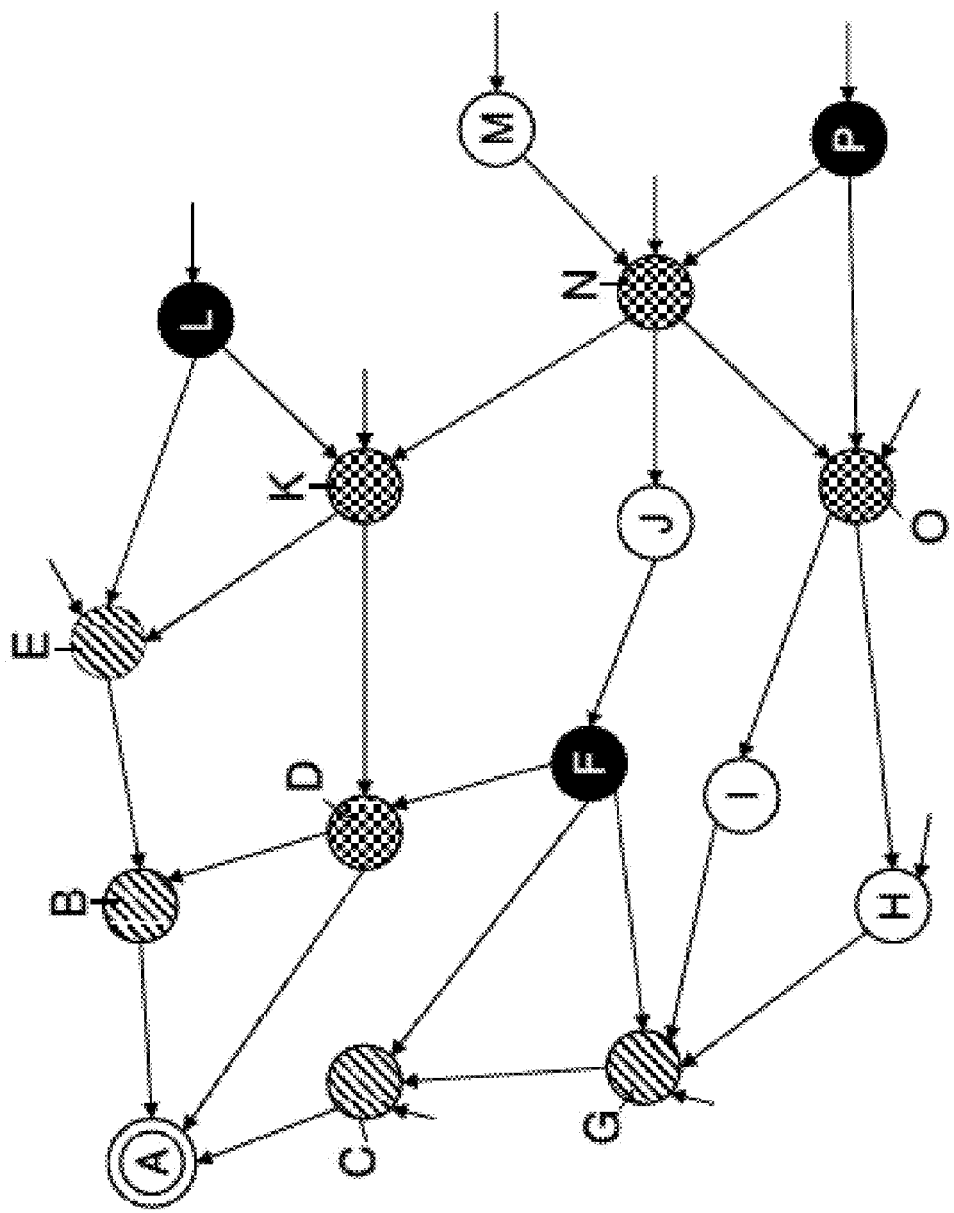
FIG. 5 shows a schematic overview depicting a communications network according to embodiments herein.

Each communication node 10 that has multiple outgoing links in a DAG balances incoming load towards that destination node 11 over those outgoing links. Each communication node 10 that has multiple incoming links merges these pieces of traffic, and perhaps re-load balances them if it has multiple outgoing links, too. The former are called splitting nodes and the latter are called merging nodes herein. Note that a communication node 10 may be both at the same time. The example in FIG. 5 shows such a DAG for a single destination wherein communication nodes 10 are marked with the letters B-P. There may be other nodes in the communications network, which carry no traffic towards a destination node A ever, but only the ones that are part of the DAG are illustrated. Black colored nodes are splitting nodes, diagonal striped nodes are merging nodes, while the doubly circled node is the destination node A. All other nodes can be source nodes, if they are they may be merging nodes as well. Combined nodes, i.e. splitting and merging nodes are checkered. Regular nodes are white and ingress nodes are nodes with at least one non connected incoming arrow.

Incoming traffic is denoted by arrows coming from the outside to nodes denoted "C", "E", "G", "H", "K", "M", "N", "O" and "P". Note that among the nodes with multiple incoming edges, only those are considered to be merging nodes, that merge traffic previously split by spitting nodes. This is because feedback packets need to be sent only toward splitting nodes.

Collecting Feedback

Figure 6:
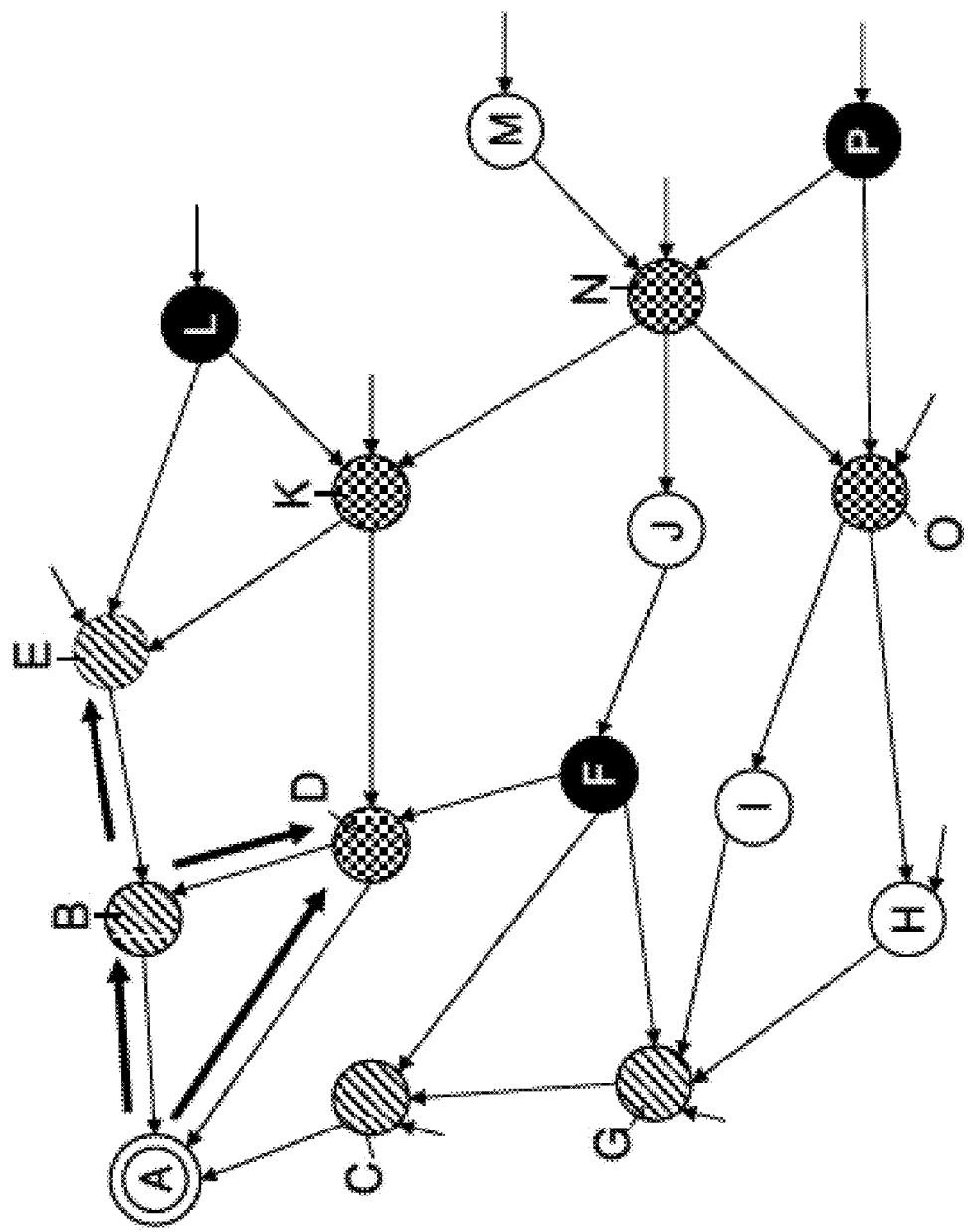
FIG. 6 shows a schematic overview depicting a communications network according to embodiments herein.

Merging nodes e.g. A, B, C, E, G, are responsible to generate periodic packets of feedback, see e.g. node "A" on FIG. 6—only some of the feedback packets are shown with thick arrows. These packets of feedback are travelling backwards on the DAG, branching further at subsequent merging nodes, see e.g. node "B" branching the incoming packet of feedback. Thus if a merging node is receiving the packets of feedback, it does not have to freshly generate its own ones, it can forward the packets of feedback received. This shall be apparent from the DAG, so merging nodes may be configured to generate fresh packets of feedback or merely expect ones arriving. Along the path the packets of feedback travel, the packets of feedback collect the congestion level: a single number. At splitting nodes, e.g. F, L, P, the packets of feedback arriving on the alternative paths shall be combined, see e.g. node "D", being both a merging and a splitting node, combining the two packets of feedback it receives from "A" and "B". If a splitting node has no further splitting nodes upstream, from where the packets come from, like P in the FIG. 6, it does not need to send any packets of feedback further upstream.

Packets of feedback collect the cost, i.e. the missed gain or threshold values, of the path the packets of feedback travel on. This is done by summarizing the local congestion levels along the path, according to embodiments herein. Specifically, the embodiments concerning feedback collection covers e.g.:

- Packets of feedback are initially generated with the congestion level of zero. Along the way at each new link of a regular node the current threshold level of the link may be added to the one carried in the packet of feedback.
- At merging nodes, e.g. A, B, C, E, G when the packet of feedback branches out, the congestion feedback collected so far may be copied to each packet of feedback sent on each incoming branch.
- At splitting nodes, e.g. F, L, P, where feedback is combined, the values of incoming congestion levels are combined into a single value. Normally, when the communications network is in balance all values returned will be the same, since the goal of load balancing is to achieve equal congestion value on all alternatives.

However, during a transition or under constantly changing traffic the returned values may differ. The communication node performing the load balancing may use the smallest of the incoming values, the largest or anything in between. For example, an average of them weighted by the load balancing ratios: if communication node "D" splits the traffic among "A" and "B" 80–20%, respectively and receives the feedback packets from them with 60 and 130, respectively; it could combine them like $0.8*60+0.2*130=74$. Since packets of feedback sum the congestion levels along a path, it is possible to get above 100, even if the maximum individual congestion level is below 100.

As a result, each splitting node will receive information regarding the congestion level of the remaining path behind each of its outgoing links. This information may then dynamically be used to adjust load balancing ratios.

Adjusting Load Balancing Ratios

A goal of the overall communications network 1 is to deliver as much total value as possible. Each communication node 10 strives to serve packets of higher remaining values to achieve this goal. In case of load balancing this goal is achieved by splitting the load in a ratio that results in equal congestion level among the alternative paths. It is easy to see why. If, for example, there are two alternative paths, the traffic is split between them and the congestion levels are e.g. 50 and 70 respectively, it means that on the first path packets of value between 50 and 70 are delivered, whereas on the second path such packets were dropped. More total value could be delivered, by shifting some of the traffic from the second alternative path to the first path. As a result, the congestion on the first path would increase, say, to 55, whereas congestion on the second path would decrease, say, to 65. By this, delivering packets of value between 50 and 55 on the first path has stopped, but instead some packets between 65 and 70 are carried instead on the second path. Delivering more valuable packets instead of lower value packets increases the total value delivered. One could continuing to shift traffic until the feedback level of the two paths becomes equal or one of them carries no traffic. Therefore if a splitting node sees differences in the congestion feedback among its outgoing alternative paths, it may, in carefully small steps, start changing the load balancing ratios so that low congestion alternative paths get more packets and high congestion alternative paths get less packets. The congestion feedback may thus be related to path lengths. Some embodiments disclosed herein base load balancing on the sum of the congestion levels along the remaining path.

The splitting nodes may split the traffic in sufficiently small pieces, say, by being able to move small microflows among the outgoing alternative paths. This may be done by hashing 5-tuple data, or using entropy labels, and assigning ranges of the hash to outgoing alternatives. A sufficiently large number of such microflows is assumed, so a gradual change of the hash ranges moves traffic in a gradual fashion. These assumptions are usually met in a communications network, which aggregates many smaller flows. 5-tuple data and using entropy labels are two ways of identifying microflows. Here we define a microflow as a set of packets that should be delivered in the same order. We aim to achieve in-order delivery by sending all packets of such a microflow over the same path, as transmitting them over different paths would lead to different transmission delay and hence re-ordering. This is a standard assumption in load balancing in IP networks.

The first method assumes an IP network and one can see port numbers and protocol number. The goal here is to keep packet order within an assumed transport connection, such as a TCP connection. Then taking the 5 tuple, i.e. IP addresses, port numbers, protocol, and hashing it results in the same hash for packets of the same microflow. Then distributing the hash space among the alternatives in a certain ratio will result in the same load balancing ratio. Say, if the hash is 4 bits long, would be much longer in real life, and we have 3 alternatives and want a 25%-25%-50%-split, packets would be sent with hash 0-3 on alt #1, 4-7 on alt #2 and 8-15 on alt #3.

The second method, i.e. the entropy label, works on the same principle, but the actual hash is not computed by the load balancing node, but somewhere at the edge of the communications network 1 and is attached to a packet in a header field, called entropy label. Load balancers then only need to look at this label. The benefit is that the load balancers do not need to parse the packets all the way to the TCP port numbers. This method is useful in e.g., Ethernet, where this way Ethernet switches can do load balancing based solely on Ethernet fields. Also it enables the network edge nodes to decide what traffic to deliver in-order, not just TCP connections. Also, if the network edge node encrypts the traffic, load balancing and in-order delivery remains possible even if the inside of the communications network 1 does not see the port numbers.

The exact algorithm is not described herein other than "shift a bit until they become equal". Load balancing ratios should not be changed quickly to avoid oscillations, which would happen, if a link is lowly congested and multiple splitting nodes starts moving traffic to it too quickly, before receiving feedback about the increasing congestion there. Note that slow reaction to changes does not create a serious problem, like routing loops or similar: it merely results in some loss of value.

Optional Policing

Figure 7:
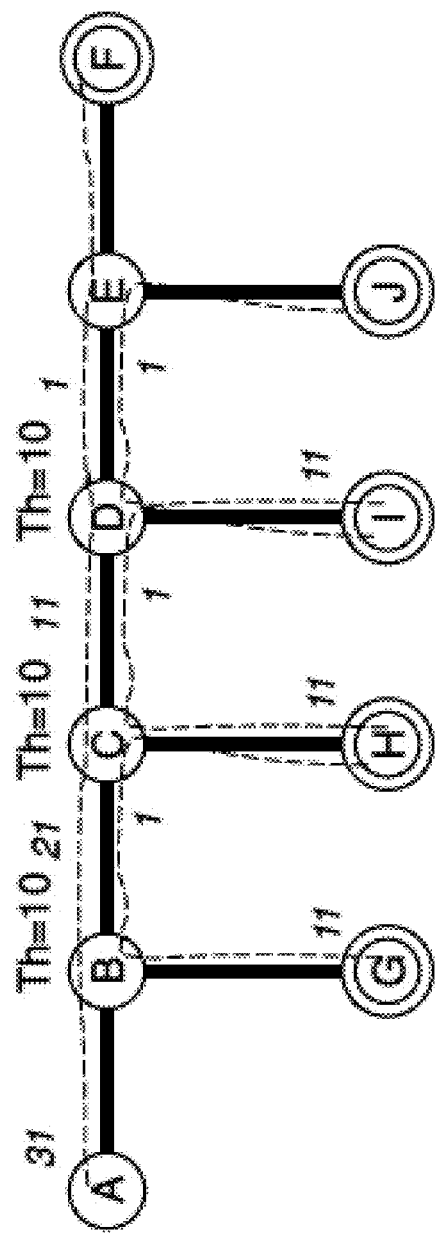
FIG. 7 shows a schematic overview depicting a communications network according to embodiments herein.

Take the example in the FIG. 7. If the packet from source node A starts with a lower value, say 25, it will get dropped at node D (25-10-10-10<0) and waste capacity over the BC and CD links. Therefore it is beneficial to drop it already at node B or A. Such dropping of excess traffic is one way of congestion control—and adaptation of traffic to the available capacity.

Normally this is performed in an end-to-end fashion, by adaptive transport protocols, such as TCP or it can also be achieved by partially deployed ConEx. In such cases the mechanism described below is not necessary. However, if any of the flows is not under congestion control, the below policing may provide a reduction in loss and increase in total value transmitted.

Since embodiments herein include packets of feedback that carry the combined congestion threshold values of entire paths, these feedback values may be used to estimate if a packet will be delivered on a given path or not.

Figure 9:
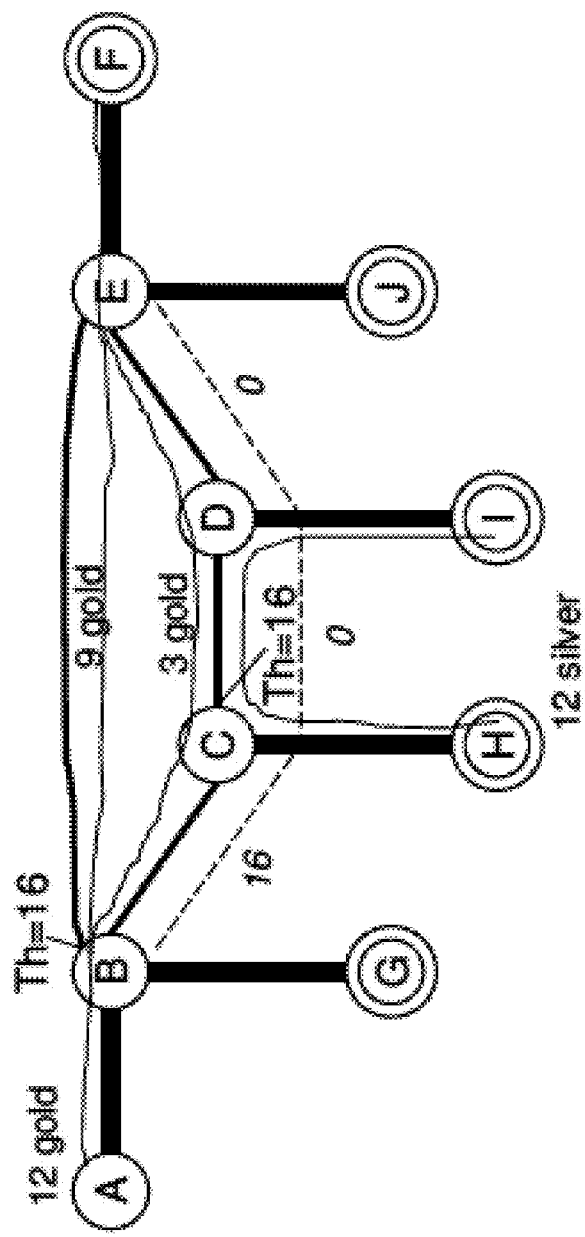
FIG. 9 shows a schematic overview depicting a communications network according to embodiments herein.

Looking at the example of FIG. 9 in the next section, 12 flows of gold and 12 flows of silver traffic, communication node B receives the combined congestion threshold value of 16 from the B-C-D-E alternative. One solution would be to drop any packets of the gold flows below value 16. This, however, would not allow probing for more capacity, thus some extra traffic below the current threshold may be let through.

Embodiments herein do not specify an exact way of policing, but just give a ConEx-like example. In this algorithm, the operator specifies some bandwidth per outgoing alternative: this much traffic should be let through below the received threshold. Of course, the largest value packets below the threshold shall be preferred, as these have the highest chance of making it through and thereby discovering additional capacity.

Policers may be placed at branching nodes and/or entry points depending on how packets of feedback are generated. In the section describing collecting feedback it was described that only merging nodes generate packets of feedback and branching nodes potentially consume them. For the policing described in this section to work, all destination nodes may start generating packets of feedback and it is the entry nodes that do the policing, so that policing is based on congestion information for the entire path of the packets. If, however, packets of feedback are consumed at branching nodes, policing of limited effectiveness may still be achieved in the branching nodes.

EXAMPLES

Below are a few examples described and illustrated.

Turning back to FIG. 7. The FIG. 7 shows a simple transport network, with 4 pieces of traffic, illustrated with dashed lines. Thick lines indicate links. Numbers indicate the current threshold at the output ports i.e. Th=10, or in the absence of a number, an unloaded link of utilization below 100% is indicated. E.g. the Th=10 threshold is valid for the horizontal output port of node C. The link outgoing from node C downward is unloaded. Italic numbers show the packet value of one packet in each flow. The three packets on the three short traffic paths start with value '11', while the packet on the long traffic path starts at '31'.

The current congestion level is subtracted, from the value, making it the remaining value, this is also depicted. All four packets get, barely, delivered, with remaining value of 1. The total value is from the four packets three times 11, for the short path ones, plus 31, for the long one.

The lesson from the FIG. 7 is that traffic on a longer path needs to be more important in order to get delivered than traffic on shorter paths. This makes sense since an equal value is obtained from transmitting one packet of value 30 on the long path and transmitting three packet of value 10 on the short paths, for the same cost, assuming equal packet length. Transmitting therefore a packet of value 29 on the long path generates less value than transmitting the three short packets of value 10.

Figure 8:
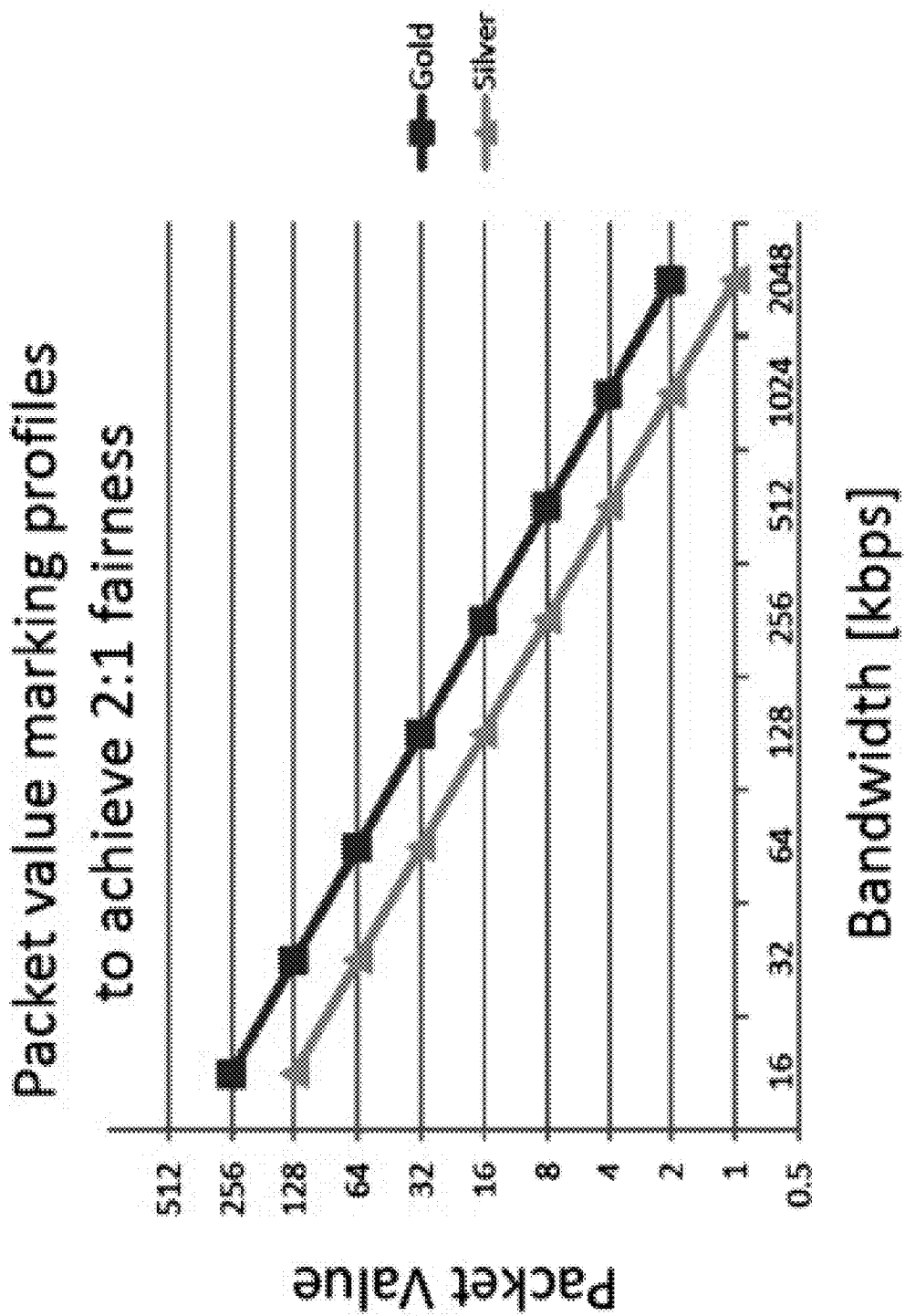
FIG. 8 is a graph depicting values relative bandwidth.

Turning to FIG. 9, another, more elaborate example of load balancing is depicted in FIG. 9. Here we have two types of flows: gold and silver. Sources mark the traffic according to the below profiles. Since gold traffic is more important, the volume of a gold flow marked with a value higher than v is twice as much as the volume of a silver flow marked with a value higher than v for any value of v. This is depicted on the marking profiles in FIG. 8. Packet values are defined along a vertical axis and bandwidth are defined along a horizontal axis. Values of gold flows are marked along the square marked line and values of silver flows are marked along the triangular marked line. Such value marking in essence means that on a single bottleneck gold flows always received twice as much capacity as silver flows. This can be understood if one considers that a good scheduler—under any circumstance—would let packets above a congestion threshold value through, while dropping the ones below. The level of congestion and the composition of the values in the offered traffic will determine the congestion threshold value. If one looks at the FIG. 8, at any given value, the packets marked with that or higher value will be twice as much for gold as for silver traffic. Note that this example the highest possible value on a packet is 512 and not 100 as in prior examples.

The topology in FIG. 9 shows the routing paths for A-to-F traffic, two alternative paths between B and E, and for H-to-I traffic, no alternatives exist. Thinner lines represent 2304 kbit/s capacity, this is 9*256, and the thick lines represent much more. In the illustrated example 12 gold flows are being sent from A to F, and 12 silver flows are being sent from H to I. Each flow is greedy and load balancing is performed by moving complete flows, such load balancing happens only in B in the example.

Two links get congested: the B-to-E and C-to-D. To achieve the same level of congestion on each of its two alternatives, B routes 9 gold flows to the BE link and 3 to the CD link. The latter three flows, combined with the 12 silver flows, which always use half the capacity of a gold flow, result in the same amount of congestion, specifically '16'. For the 9 gold traffic, dividing the 2304 kbits BE link to 9 equal parts result in 256 kbits per flow. Looking at the marking profile, the Gold flows are marked such that 265 kbits of them get value '16' or higher, thus this results in the congestion threshold value of '16' on the BE link. On the CD link, the congestion threshold level is also '16'. At this value, the three gold flows get 256 kbit/s, whereas the silver flows get 128 kbits each. In total this results in 2304 kbit/s which is exactly the available capacity.

The congestion level on the CD link is reported back to B, using the congestion feedback packets on the E→D→C→B reverse direction. Initially the packet of feedback starts with zero. D will not change this since the DE link is not utilized fully. C will update the value to '16' to reflect the congestion on the CD link. B will add the congestion threshold it sees on the BC link, i.e. zero, which comes at the total of '16' in the star callout. At this point the system is in equilibrium.

Figure 10:
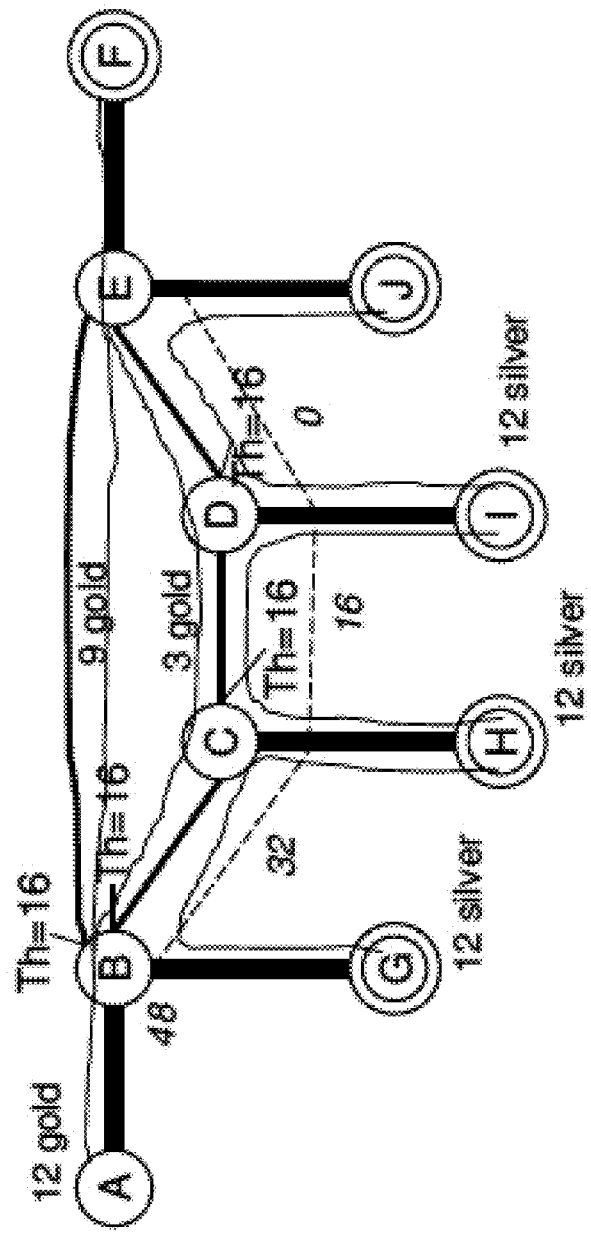
FIG. 10 shows a schematic overview depicting a communications network according to embodiments herein.

Now assume, as shown in FIG. 10, that 24 more silver flows enter, 12 from G to H and 12 from I to J. In this case congestion appears on the BC and the DE links, as well.

This creates sub-optimal resource allocation. In order to carry a gold packet of value '16' on the B-C-D-E path, one silver packet of value '15', or lower, is dropped on each of the three links. We would generate more value by carrying the value '15' silver packets as opposed to the value '16' gold packet. This is also reflected in the packet of feedback, which will now arrive with value '32' to B, which itself will add its own threshold of the BC link resulting in the total reported congestion of '48'. Since this is higher, than the other alternative, B will start moving the gold flows back to the direct BE link. The packet of feedback travels on the E-D-C-B path, in the opposite direction than the traffic it refers to, and at each node it arrives at the node adds the local congestion of the outgoing, from the point of view of the data traffic, link/port the packet of feedback arrived through/at. Thus node E adds nothing, starts with zero value, node D adds the local congestion at its outgoing port of the DE link, node C does the same for the CD link and node B does the same for the BC link. Thus, the value in the packet of feedback is '48' after all additions are made. This value represents the total congestion on the B-C-D-E path, which will be used by node B when considering what portion of the load to send on this path.

Figure 11:
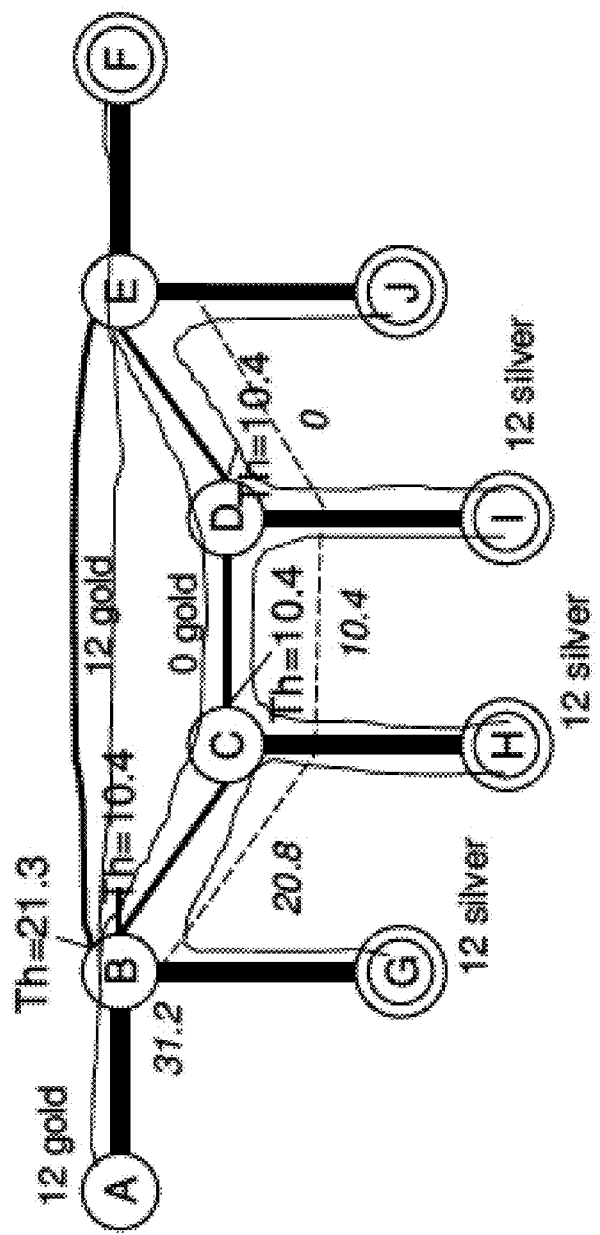
FIG. 11 shows a schematic overview depicting a communications network according to embodiments herein.

Even after moving all the 12 gold flows to the BE link, see FIG. 11, the two alternatives do not get balanced. The congestion on the BE link increases to '21.3', each gold flow gets 192 kbit/s only, whereas the congestion on each of the other three links get to '10.4', each silver flow gets 192 kbit/s, but due to their lower value this same bandwidth results in a smaller threshold value than for gold traffic. However, the combined congestion feedback on the E→D→C→B reverse path will be '31.2', which is still higher than that of the BE-link. This means that it is not worth it to move even a single packet from the BE link to the longer path, as it will destroy more value, namely 3 other packets, which have more than ⅓rd value of the gold packet.

Embodiments herein permit a fully automatic communications network that takes QoS into account and aims to use all available links to carry traffic.

Due to the value concept, more valuable traffic enjoys a preference over less valuable traffic. Load balancing, according to some embodiments, shifts traffic away from its shortest path to a longer one only up to the extent it is worth disturbing shortest path traffic there. One case is when the longer path is not 100% utilized, in this case there is no downside of splitting some traffic there. If the longer path is fully utilized, but only very low value packets are dropped there, it may still make sense to shift traffic there, especially if the shortest path is very congested and even high value packets get dropped. This way, QoS is always honored by the system, while at the same time all paths are being used.

Moreover the value concept enables the expression of a very rich set of QoS needs, from bandwidth guarantees, through high priority traffic to proportional sharing; or any combination thereof. For example, one can say that a piece of traffic shall have very high priority up to 1 Mbit/s; above which it shall have diminishing importance, reaching zero value above 5 Mbit/s. The communications network 1 will even deliver packets of zero value if nobody uses the network.

The path computation algorithm does not need to take traffic matrix or the real-time traffic situation into account; it merely needs to set up the set of possible forwarding paths and load balancing will do the traffic engineering. This allows easy, scalable, fast and distributed path computation, much the same as today.

The packet scheduler is simple and lends itself to hardware implementation.

The operational cost of the communications network 1 is minimal. Some parameters of the path computation algorithm may need to be tuned. One of the very few meaningful parameters, that can be controlled, may be in path computation, the number of alternative paths for a DAG may be restricted to save state and to avoid very long detours, resulting in overly long delays. If we do so, we deliberately sacrifice network utilization in favor of transmission delay. All other policies may be expressed by the way packets are assigned values at the edges. And this is easy as the packet value space provides a uniform reference to talk about QoS requirements and relative importance of traffic even arriving from different ingress nodes.

The communications network 1 is almost as scalable as today's communications networks. More forwarding entries are needed due to the more extensive DAGs, but not to a large extent. OAM packets also called packets of feedback need to travel every link—one for each destination, but these can be grouped together to lessen the load. These packets of feedback may also be used for any other purpose OAM packets are used today, such as fault monitoring, load counting, delay measurement, etc.

The robustness of the communications network is also automatic and comes for free. In the absence of feedback packets from certain directions, load balancers simply shift the traffic away from that path real quick. Note that even during such transitional periods QoS is still being honored by the value aware schedulers.

Figure 12:
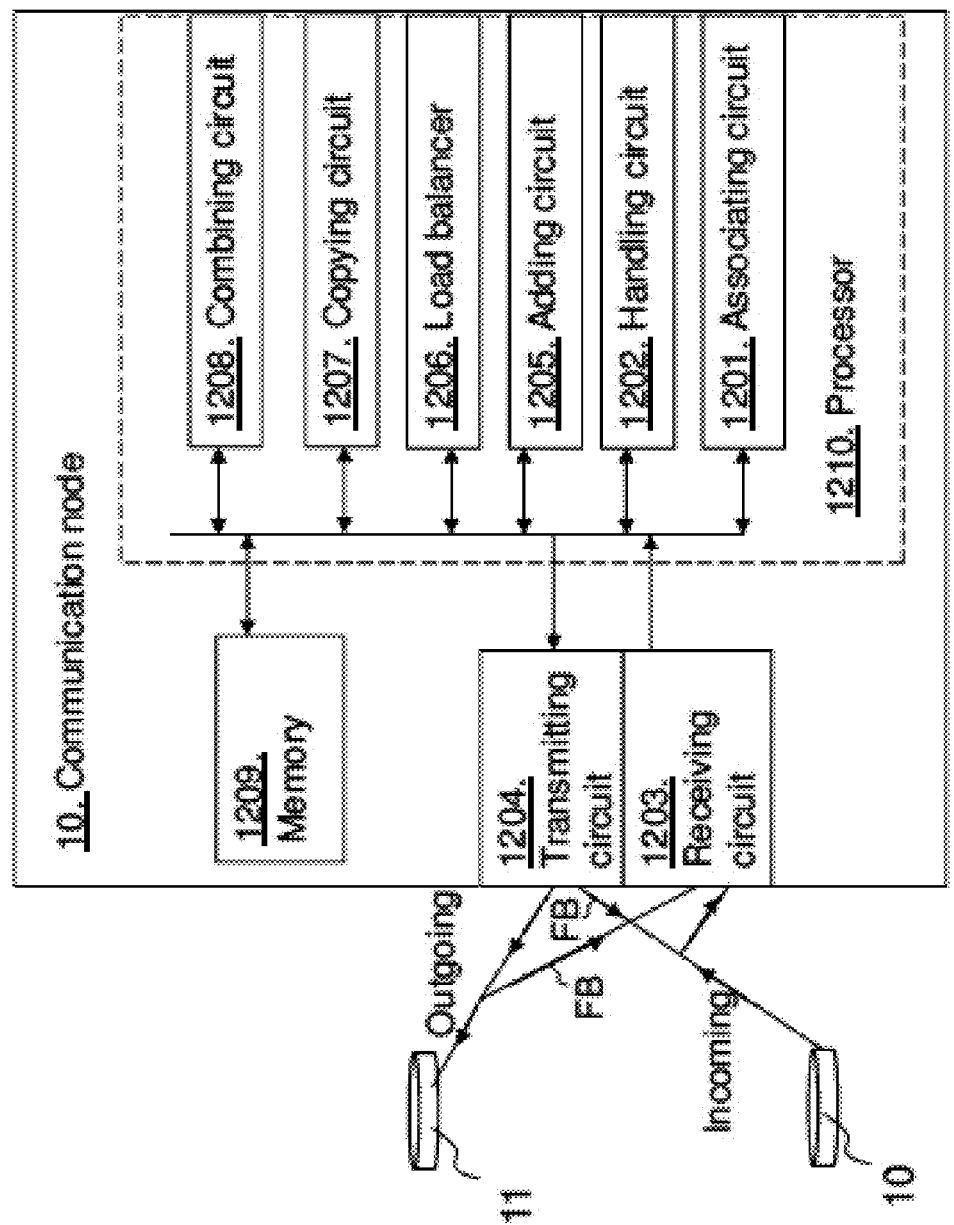
FIG. 12 shows a block diagram depicting a communication node according to embodiments herein.

Embodiments herein provide a communication node configured to perform the methods described above. FIG. 12 discloses the communication node 10 for handling a packet to the destination node 11 in the communications network 1 configured to perform the methods herein.

The communication device 10 may comprise an associating circuit 1201 configured to associate the packet with a remaining value, which remaining value is a packet value reduced by a threshold value of an outgoing link from the communication node 10 towards the destination node 11, and which threshold value corresponds to a congestion level of the outgoing link.

The communication device 10 may further comprise a handling circuit 1202 configured to handle the packet based on the remaining value by determining whether to drop or to transmit the packet along the outgoing link based on the remaining value.

In some embodiments the communication node 10 comprises a receiving circuit 1203 configured to receive the packet with the packet value over an incoming link to the communication node 10; and the handling circuit 1202 may then be configured to replace the packet value with the remaining value and to transmit the packet with the remaining value over a transmitting circuit 1204.

The receiving circuit 1203 may be configured to receive a packet of feedback over the outgoing link indicating a second threshold value from another communication node. The communication node 10 may comprise an adding circuit 1205 that is configured to add the threshold value to the packet of feedback. The transmitting circuit 1204 may further be configured to forward the feedback over an incoming link.

The receiving circuit 1203 may further be configured to receive a respective packet of feedback over the outgoing link and at least one other outgoing link, which respective packet of feedback comprises a value which corresponds to a congestion level towards the destination node 11. The communication node 10 may comprise a load balancer 1206 configured to perform load balancing over the outgoing link and the at least one other outgoing link taking the values of the respective packet into account.

The receiving circuit 1203 may further be configured to receive a packet of feedback over an outgoing link, which packet of feedback comprises a value that corresponds to a congestion level at another communication node connected via the outgoing link to the communication node. The communication node 10 may further comprise a copying circuit 1207 configured to copy the value from the received packet of feedback to one or more packets of feedback. The adding circuit 1205 may be configured to add the threshold value to the one or more packets of feedback. The transmitting circuit 1204 may then be configured to transmit the packet of feedback over a respective incoming link towards a respective communication node.

The receiving circuit 1203 may further be configured to receive a respective packet of feedback over at least two outgoing links, which respective packet of feedback comprises a value. Each respective value corresponds to a congestion level at a respective communication node connected, via respective outgoing link, to the communication node 10. The communication node 10 may further comprise a combining circuit 1208 configured to combine the respective values into one value; attach the combined value with the threshold value to a packet of feedback. The transmitting circuit 1204 may then be configured to transmit the packet over an incoming link towards another communication node. The combining circuit 1208 may be configured to average the respective values, and/or to take a split ratio for load balancing into account when combining the respective values.

The communication node may be configured to store the one or more values of the packet of feedback at the communication node 10 in a memory 1209 to be used in packets of feedback transmitted later and/or periodically. The memory 1209 may comprise one or more memory units and be configured to be used to store data on, such as values, remaining values, thresholds, applications to perform the methods disclosed herein and similar.

The receiving circuit 1203 may further be configured to receive a packet of feedback over an outgoing link, which packet carries one value per destination node being multiplexed into the packet. The adding circuit 1205 may then be configured to de-aggregate the value per destination node; to update the value for each destination node by adding the threshold value to the value per destination node; and to re-aggregate the updated values into the packet of feedback. The transmitting circuit 1204 may then be configured to transmit the packet of feedback over an incoming link towards another communication node such as the communication node 10.

As stated above the packet value corresponds to a level of importance along a linear scale, and the threshold value corresponds to a congestion level along a linear scale.

The handling circuit 1202 is configured to handle the packet by dropping the packet when the remaining value is zero or below, and marking the packet with the remaining value and transmitting, via the transmitting circuit 1204 the packet along the outgoing link when the remaining value is above zero.

The transmitting circuit 1204 may further be configured to transmit one or more packets with a remaining value of zero or below for probing the outgoing link.

The handling circuit 1202 may further be configured to prioritize packets based on level of remaining values to maximise performance.

As will be readily understood by those familiar with communications design, that functions from other circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

The embodiments herein for handling the packet may be implemented through one or more processors 1210 in the communication node 10 depicted in FIG. 12, together with computer program code for performing the functions and/or method actions of the embodiments herein. The program code mentioned above may also be provided as a computer program product, for instance in the form of a data carrier carrying computer program code for performing embodiments herein when being loaded into the communication node 10. One such carrier may be in the form of a CD ROM disc. It is however feasible with other data carriers such as a memory stick. The computer program code may furthermore be provided as pure program code on a server and downloaded to the communication node 10.

Figure 13:
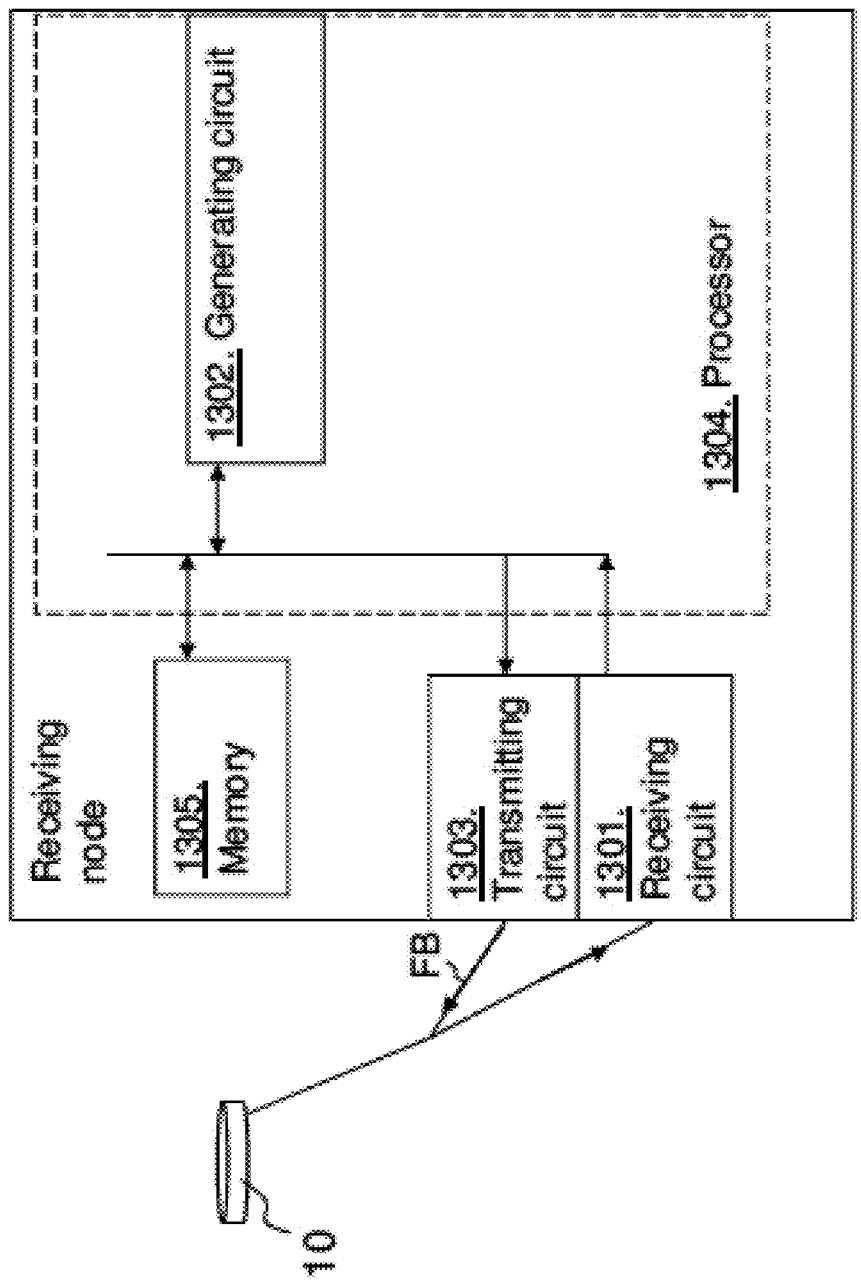
FIG. 13 shows a block diagram depicting a receiving node according to embodiments herein.

In order to perform the methods herein a receiving node such as the destination node 11, but may also be one of the communication nodes 10, is provided and configured to perform the methods herein. FIG. 13 shows a block diagram depicting a receiving node according to embodiments herein for receiving a packet from the communication node 10. The receiving node is configured to perform the embodiments disclosed herein.

The receiving node may comprise a receiving circuit 1301 configured to receive a packet over an incoming link from the communication node. The packet comprises a remaining value, which remaining value is a packet value reduced by a threshold value of an outgoing link from the communication node 10 towards the receiving node, and which threshold value corresponds to a congestion level of the outgoing link.

The receiving node may further comprise a generating circuit 1302 configured to generate, in response to receiving the packet, a packet of feedback, which packet comprises a value that corresponds to a congestion level at an outgoing link of the receiving node. The receiving node may be the destination node 11 and then the generating circuit 1302 is configured to set the value as an initial value of zero as no outgoing traffic occurs from the destination node 11.

The receiving node may further comprise a transmitting circuit 1303 configured to transmit the packet of feedback over an incoming line towards the communication node 10.

The embodiments herein for receiving the packet from the communication node 10 may be implemented through one or more processors 1304 in the receiving node depicted in FIG. 13, together with computer program code for performing the functions and/or method actions of the embodiments herein. The program code mentioned above may also be provided as a computer program product, for instance in the form of a data carrier carrying computer program code for performing embodiments herein when being loaded into the receiving node. One such carrier may be in the form of a CD ROM disc. It is however feasible with other data carriers such as a memory stick. The computer program code may furthermore be provided as pure program code on a server and downloaded to the receiving node.

The receiving node further comprises a memory 1305 configured to be used to store data, such as values, remaining values, thresholds, applications to perform the methods disclosed herein and similar.

Embodiments herein relate discloses a computer program product for handling a packet from a communications node to a receiving node, the computer program product comprising at least one computer-readable storage medium having computer-readable program code portions stored therein, the computer-readable program code portions be configured to perform the methods herein when being executed on a processor at the communication node 10. Some embodiments provide a computer program product for receiving a packet from a communications node, the computer program product comprising at least one computer-readable storage medium having computer-readable program code portions stored therein, the computer-readable program code portions be configured to perform the methods herein when being executed on a receiving node 11.

Alternatively, several of the functional elements of the processor/s or processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

What is claimed is:

1. A method, in a communication node, for handling a packet to a destination node in a communications network, the method comprising:
   associating the packet with a remaining value, the remaining value being a packet value reduced by a threshold value of an outgoing link from the communication node towards the destination node, the threshold value corresponding to a congestion level of the outgoing link; and
   handling the packet based on the remaining value, the handling comprising determining whether to drop or to transmit the packet along the outgoing link based on the remaining value;
   receiving a first packet of feedback, over the outgoing link and from another communication node, indicating a second threshold value; and
   adding the threshold value to the first packet of feedback and forwarding the first packet of feedback over an incoming link.

2. The method of claim 1:
   further comprising receiving the packet with the packet value over the incoming link to the communication node;
   wherein the associating comprises replacing the packet value with the remaining value; and
   wherein the handling comprises transmitting the packet with the remaining value.

3. The method of claim 1, further comprising:
   receiving a respective packet of feedback over at least one other outgoing link, the first packet of feedback and each respective packet of feedback comprising a value which corresponds to a congestion level towards the destination node; and
   performing load balancing, over the outgoing link and the at least one other outgoing link, taking the values of the first packet of feedback and each respective packet of feedback into account.

4. The method of claim 3, further comprising:
   combining the values of the respective feedback packets into one combined value;
   attaching the combined value with the threshold value to the first packet of feedback.

5. The method of claim 4, wherein the combining comprises averaging the respective values, and/or taking a split ratio for load balancing into account.

6. The method of claim 1, wherein the first packet of feedback comprises a value which corresponds to a congestion level at the another communication node, the method further comprising:

copying the value from the first packet of feedback to one or more second packets of feedback;
adding the threshold value to the one or more second packets of feedback; and
transmitting each of the one or more second packets of feedback over a respective incoming link towards a respective communication node.

7. The method of claim 1:
wherein the first packet of feedback carries one value per destination node being multiplexed into the first packet of feedback;
wherein adding the threshold value to the first packet of feedback comprises:
de-aggregating the value per destination node;
updating the value for each destination node by adding the threshold value to the value per destination node;
re-aggregating the updated values into the first packet of feedback.

8. The method of claim 1, wherein the handling comprises:
dropping the packet when the remaining value is zero or below;
marking the packet with the remaining value and transmitting the packet along the outgoing link when the remaining value is above zero.

9. The method of claim 1, further comprising transmitting one or more packets with a remaining value of zero or below for probing the outgoing link.

10. The method of claim 1, wherein the handling comprises prioritizing packets based on level of remaining values respectively comprised therein.

11. A communication node for handling a packet to a destination node in a communications network, the communication node comprising:
one or more processing circuits configured to:
associate the packet with a remaining value, the remaining value being a packet value reduced by a threshold value of an outgoing link from the communication node towards the destination node, the threshold value corresponding to a congestion level of the outgoing link; and
handle the packet based on the remaining value by determining whether to drop or to transmit the packet along the outgoing link based on the remaining value;
receive a first packet of feedback, over the outgoing link and from another communication node, indicating a second threshold value; and
add the threshold value to the first packet of feedback and forward the first packet of feedback over an incoming link.

12. A method, in a communication node, for handling a packet to a destination node in a communications network, the method comprising:
associating the packet with a remaining value, the remaining value being a packet value reduced by a threshold value of an outgoing link from the communication node towards the destination node, the threshold value corresponding to a congestion level of the outgoing link; and
handling the packet based on the remaining value, the handling comprising determining whether to drop or to transmit the packet along the outgoing link based on the remaining value;
receiving a respective packet of feedback over the outgoing link and at least one other outgoing link, each respective packet of feedback comprising a value which corresponds to a congestion level towards the destination node; and
performing load balancing, over the outgoing link and the at least one other outgoing link, taking the values of the respective packets of feedback into account.

13. The method of claim 12:
further comprising receiving the packet with the packet value over an incoming link to the communication node;
wherein the associating comprises replacing the packet value with the remaining value; and
wherein the handling comprises transmitting the packet with the remaining value.

14. The method of claim 12, further comprising:
adding the threshold value to a received packet of feedback and forwarding the received packet of feedback over an incoming link.

15. The method of claim 12, further comprising:
copying the value from any of the received packets of feedback to one or more first packets of feedback;
adding the threshold value to the one or more first packets of feedback; and
transmitting the one or more first packets of feedback over respective incoming links towards respective other communication nodes.

16. The method of claim 12, further comprising:
combining the values of the respective packets of feedback into one combined value;
attaching the combined value with the threshold value to a first packet of feedback;
transmitting the first packet of feedback over an incoming link towards another communication node.

17. The method of claim 16, wherein the combining comprises averaging the values of the respective packets of feedback, and/or taking a split ratio for load balancing into account.

18. The method of claim 12, wherein a received packet of feedback carries one value per destination node being multiplexed into the received packet of feedback, the method further comprising:
de-aggregating the value per destination node;
updating the value for each destination node by adding the threshold value to the value per destination node;
re-aggregating the updated values into the received packet of feedback; and
transmitting the received packet of feedback over an incoming link towards another communication node.

19. The method of claim 12, wherein the handling comprises:
dropping the packet when the remaining value is zero or below;
marking the packet with the remaining value and transmitting the packet along the outgoing link when the remaining value is above zero.

20. The method of claim 12, further comprising transmitting one or more packets with a remaining value of zero or below for probing the outgoing link.

21. The method of claim 12, wherein the handling comprises prioritizing packets based respective remaining values comprised therein.

22. A communication node for handling a packet to a destination node in a communications network, the communication node comprising:
one or more processing circuits configured to:
associate the packet with a remaining value, the remaining value being a packet value reduced by a threshold value of an outgoing link from the communication node towards the destination node, the threshold value corresponding to a congestion level of the outgoing link; and handle the packet based on the remaining value by determining whether to drop or to transmit the packet along the outgoing link based on the remaining value;

receive a respective packet of feedback over the outgoing link and at least one other outgoing link, the respective packet of feedback comprising a value which corresponds to a congestion level towards the destination node; and perform load balancing, over the outgoing link and the at least one other outgoing link, taking the values of the respective packets of feedback into account.

* * * * *